I. T. ULLRICH.
AGRICULTURAL IMPLEMENT.
APPLICATION FILED NOV. 26, 1919.

1,376,236.

Patented Apr. 26, 1921.

Inventor
I. T. Ullrich.

By

Attorneys

UNITED STATES PATENT OFFICE.

IRVING THOMAS ULLRICH, OF WOLCOTT, NEW YORK.

AGRICULTURAL IMPLEMENT.

1,376,236.  Specification of Letters Patent.  Patented Apr. 26, 1921.

Application filed November 26, 1919. Serial No. 340,885.

*To all whom it may concern:*

Be it known that I, IRVING T. ULLRICH, a citizen of the United States, residing at Wolcott, in the county of Wayne and State of New York, have invented new and useful Improvements in Agricultural Implements, of which the following is a specification.

My invention relates to improvements in agricultural implements and refers more particularly to attachments for cultivators to adapt the latter for harvesting onions.

The principal object of the invention is to provide a simple and inexpensive set of attachments of the kind referred to, which may be quickly and easily applied to the usual type of hand cultivator, and which will effectively perform the functions of bending down the onion tops and weeds, severing the onions from the roots and then separating the onions from the soil and delivering the onions to a windrow.

With the foregoing and other objects in view, my invention comprises the new and useful details of construction and arrangement, which will be hereinafter fully described, illustrated in the annexed drawing, and claimed.

Figure 3:
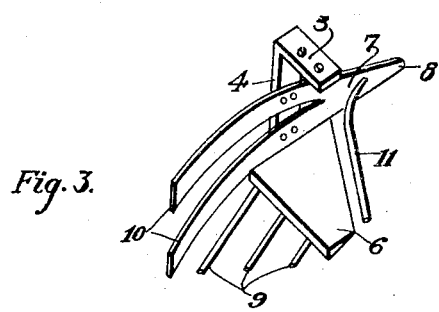
Fig. 3 is a detail in perspective.
Figure 1:
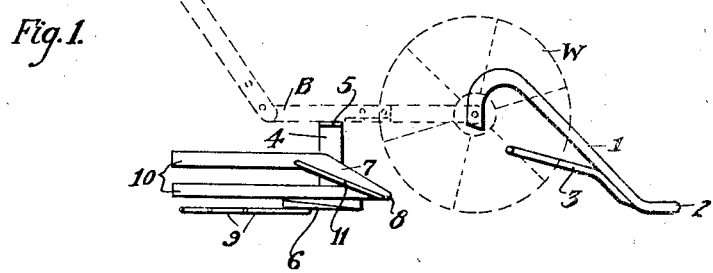
Figure 1 is a side elevation of my attachment, a typical form of hand cultivator being shown in dotted lines.
Figure 2:
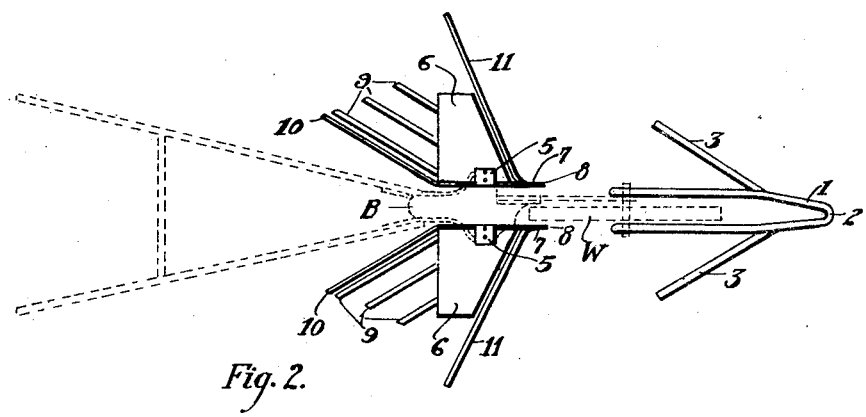
Fig. 2 is a top plan view of my attachment also shown in its operating relation.

Referring specifically to the drawing, the invention is shown applied to an ordinary hand cultivator of the single wheel type, but it will be understood, that it is also applicable to other types of cultivators.

To the axle of the cultivator wheel W is fastened a track clearer composed of a bar which is forked to straddle the wheel and has its two branches united in front of the wheel as shown at 2. The forward united ends of the bars have a bend to form a shoe adapted to ride along the ground between the onion rows. Just back of the shoe 2, I provide a leveling fender 3 on each side of the track clearer, said fenders being bars or rods which are attached to the branches 1, and extend rearwardly and outwardly, and also have an upward slant, at such a predetermined angle as is best suited to bend the weeds and onion tops outward and downward, thus to clear the track for the advancing cultivator wheel.

On the cultivator beam B, rearward of the wheel W, I fix a pair of downwardly extending shanks 4 bolted to the beam in any suitable manner, as by the horizontal flanges 5. Extending outward from the lower ends of the shanks 4 are cutting blades 6, the same being sharpened on the forward edges and positioned so that in operation the blades will be directed slightly downward the rear edges thereof being substantially higher than the cutting edges. The cutting edge of each blade is oblique to the line of travel to obtain a shearing cut. Fixed to each of the shanks 4, at right angles to the blade 6, is a V-shaped guide member 7 having its pointed forward end 8 positioned in advance of the cutter blade, the bifurcated rear ends being bent outwardly to form guide arms 10. Fixed to the rear of the cutting blade 6 is a plurality of rearwardly extending tines 9, also bent outwardly substantially parallel to the guide arms 10. A leveling arm 11 may also be attached to each of the guide members, the arm 11 being carried substantially parallel to the cutting edge of the blade 6 and positioned above the same.

In operation, it will be apparent that as the cultivator is moved forward, the track clearing attachment will part the weeds and bend the onion tops down on each side of the advancing wheel. As the implement further advances, the onion tops will be further bent over by the action of the leveling arms 11, the blades 6 severing the onions from the roots. The onions thus severed will travel up the inclined surface of the blades and onto the tines 9, where they will become separated from the accompanying soil, the soil falling through the spaces between the tines. By reason of the forward movement of the device, as the onions accumulate on the blades and tines, they will be propelled against the outwardly curved guide arms 10 and thus directed outward to a windrow beside the path of the implement.

From the foregoing description it will be seen that my invention provides a simple and inexpensive set of attachments for a cultivator which will effectually perform the functions of cutting and harvesting onions.

I claim:

1. The combination with a wheel cultivator, of an onion harvesting attachment comprising an elongated track clearing runner straddling the cultivator wheel in position to be propelled ahead of said wheel, an outwardly extending fender carried on each side of the track clearing runner in position to bend down the onion tops, cutting blades on each side of the cultivator rearward of the wheel, soil separating tines projecting rearwardly from the blades, and an upstanding guide member at the inner end of each of the blades, and having outwardly curved rear ends positioned to direct the severed onions outwardly.

2. The combination with a wheel cultivator, of an onion harvesting attachment comprising an elongated track clearing runner straddling the cultivator wheel in position to be propelled ahead of said wheel, an outwardly extending fender carried on each side of the track clearing runner in position to bend down the onion tops, cutting blades on each side of the cultivator rearward of the wheel, a leveling arm spaced upward from and running in the direction of the length of the blades, soil separating tines projecting rearwardly from the blades, and an upstanding guide member at the inner end of each of the blades, and having outwardly curved rear ends positioned to direct the severed onions outwardly.

In testimony whereof I affix my signature.

IRVING THOMAS ULLRICH.